Dec. 31, 1940. W. R. EDDINGTON 2,226,600
MACHINE FOR TESTING TENDERNESS OF PEAS
Filed Sept. 16, 1938
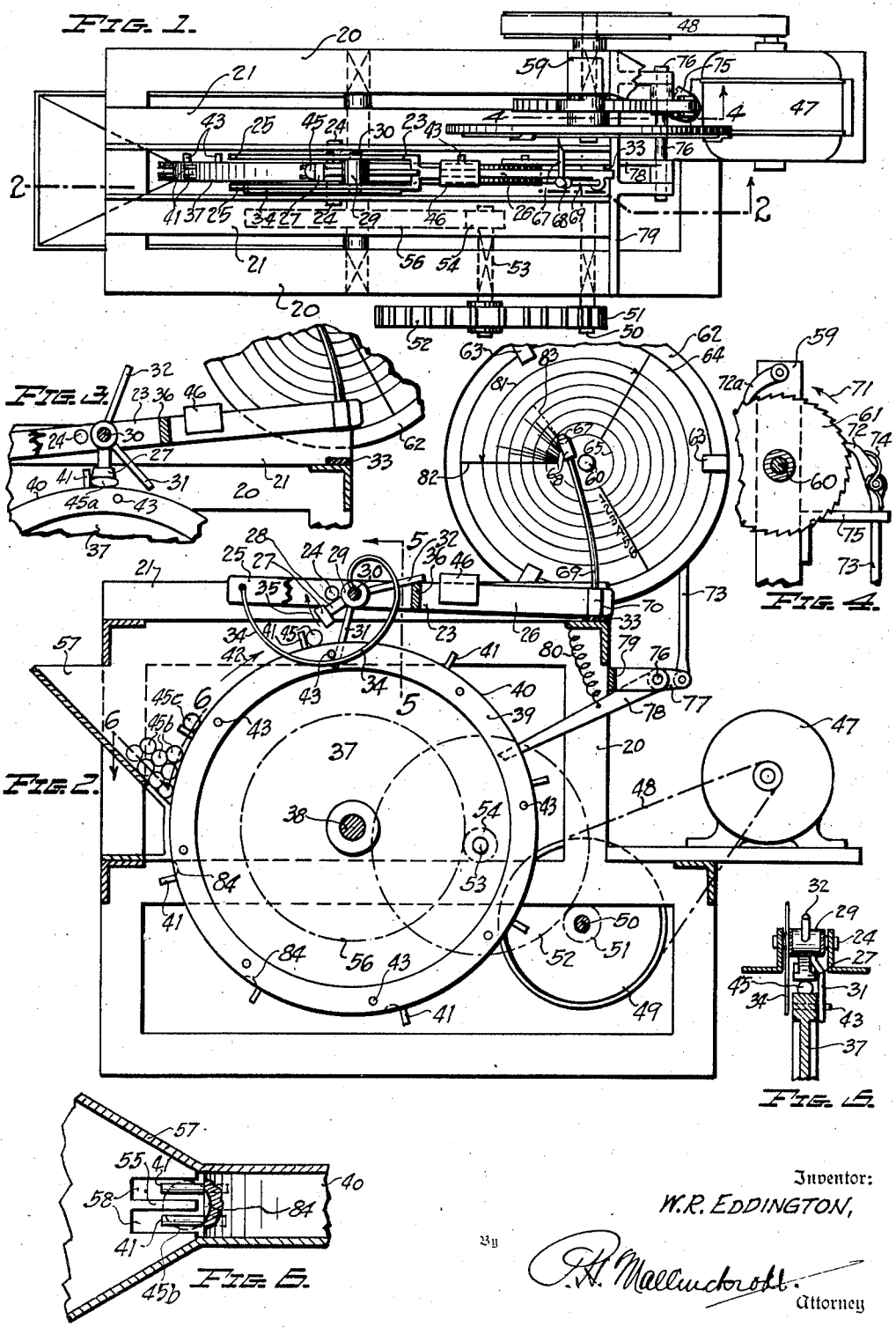
Inventor:
W. R. EDDINGTON,
By
Attorney Patented Dec. 31, 1940

2,226,600

UNITED STATES PATENT OFFICE 2,226,600

MACHINE FOR TESTING TENDERNESS OF PEAS

William R. Eddington, Springville, Utah

Application September 16, 1938, Serial No. 230,244

7 Claims. (Cl. 265—13)

This invention relates to a machine for testing the tenderness of peas, although when the nature of the machine is more fully understood, it will be seen that it is not necessarily restricted to that purpose, but may also be used for ascertaining the resistance to crushing, of commodity items or substances of different kinds.

The principal objects of the invention are to provide:

First. A simple, inexpensive machine by means of which, the relative tenderness of commodity items, such as peas, can be accurately ascertained.

Second. An instrumentality which is sensitive to small differences in degrees of relative resistance to crushing, of items placed within it.

Third. A machine in which peas are tested one by one.

Fourth. A machine which makes visible and/or records in single file, the relative degree of tenderness of peas, and which allows an average of the relative tenderness of a given number of peas to be quickly obtained.

Fifth. A machine having a large work capacity, although being portable and occupying a minimum of space.

In the drawing, which illustrates one embodiment of the invention:

Fig. 1 represents a plan;

Fig. 2, a side elevation partially in section, taken on the line 2—2, Fig. 1;

Fig. 3, a fragmentary portion of Fig. 2, showing an alternate position of certain parts;

Fig. 4, a vertical section taken on the line 4—4 in Fig. 1, showing fragmentary parts in elevation;

Fig. 5, a fragmentary vertical section taken on the line 5—5, Fig. 2; and,

Fig. 6, a fragmentary section taken on the angular line 6—6 in Fig. 2, drawn to a scale considerable enlarged.

Modern canning factories producing high grade goods, endeavor to buy peas for canning, from the growers, on a basis of quality. In order to have a yard stick for definitely measuring the quality of peas, the invention contemplates first sizing the peas and taking at random from each sized lot, a certain aggregate sample, then subjecting each individual specimen of the aggregate sample, successively to a certain suitable and uniform pressure calculated to produce a certain degree of crushing upon individual peas of a certain predetermined, relative tenderness. The invention contemplates further, to produce a graphical record on which is visibly represented the relative tenderness of each individual pea of the aggregate sample, so that the aggregate quality of any lot of peas can be quickly and accurately ascertained.

In accomplishing the purpose of the invention, an aggregate sample of peas may be dropped into a hopper, from which the peas are taken one by one, deposited on an anvil, and brought under the uniform crushing or squeezing influence of a floating hammer. The nearness of approach between the floating hammer and the anvil is determined by the relative tenderness of any particular pea that happens to be inserted between them. This nearness of approach may be made visible in various ways, for example, by causing the floating hammer means to actuate a recording device, which in the present instance, indicates graphically the relative oscillations of an arm on which the hammer is mounted, the magnitude of the oscillations being determined by the extent of the compressibility of the item interposed between the hammer and the anvil.

Referring to the drawing, the numeral 20 indicates a frame on the upper portion of which may be mounted two longitudinal members 21, suitably spaced apart from each other. Pivotally mounted at 24, so as to oscillate up and down between the members 21, is a forked lever 23, having tines 25 which are integral with an arm portion 26. Between the tines is pivotally mounted a floating hammer having the head 27, helve 28, and hub 29, the latter being fast on a shaft 30. Spaced apart angularly on the hammer around the axis of shaft 30, are two arms 31 and 32, the purpose of which will presently be explained. A light spring 34, made for example of piano wire, may have one end fast in the hub 30, and the other end fast in the near tine, this spring being tensioned to urge the hammer to move in the direction of the arrow 35. The arm 32, together with the shoulder portion 36 of the fork, act as stopping means to limit the movement of the hammer. It is to be noted that the fork 23 oscillates around the fixed pivot 24, and consequently that the hammer 27 with its pivotal shaft 30, oscillates or floats relative to the pivot 24, besides having an independent swinging or oscillating motion about the shaft 30. The arm portion 26 of the fork, constitutes the long arm of the lever means, and normally comes to rest in the position indicated in Fig. 2, after its outer end has struck a resilient buffer or cushion 33.

Cooperatively positioned relative to the hammer means is an anvil means, which in the present instance comprises a wheel 37 fast on a shaft 38, and having a rim 39 with the circumferential face 40, forming a continuous, rotatable anvil face or surface. Spaced apart from one another, preferably equally, along the circumferential anvil face, may be a plurality of protruding pins 41 arranged preferably in spaced pairs across the anvil, as clearly indicated in Fig. 6. Each pair of pins 41 is brought successively into a certain predetermined conjunction with the hammer 27, so that, as the wheel 37 is rotated in the direction of the arrow 42, the hammer shall begin descending from its position in Fig. 2 as a pair of pins approaches the hammer, being finally engaged by the approaching pins as indicated in Fig. 3. In order to bring about the initial descent of the hammer, so that it may be engaged by the pins, the arm 31 is provided, which is disposed alongside the anvil rim, so as to be engaged by the corresponding one of a series of transverse pins 43, which correspond in number to the number of pairs 41, each pin being fixed in a position angularly, somewhat in advance of the corresponding pair 41. The result is, that as soon as a pair 41 comes into suitable proximity with the hammer 27, the corresponding pin 43 engages the arm 31 so as to bring the hammer 27 down far enough to be engaged by that pair, after which the hammer is moved forward until a position is reached where the pins 41 slip past the hammer. Thereupon, the spring 34 snaps the hammer back to its original position, leaving the arm 32 in contact with the shoulder 36, ready to have the arm 31 engaged by the next pin 43. Obviously, when an item such as a pea, is placed in front of the pins 41, as indicated for example at 45, Fig. 2, and this item is carried forward as the hammer descends, that particular item, according to its compressibility, will be correspondingly mashed or crushed, and at the same time, according to its resistance to crushing or mashing, will lift the fork 23 around its pivot 24 to a certain extent, as indicated for example in Fig. 3. Obviously, the amount of pressure or weight that is exerted upon the item between the hammer and the anvil, is determined by the ratios of the leverages, and the moments, developed around the fulcrum axis at 24. The excess weight of the long lever arm 26, may be adjusted by means of a movable counterweight 46, which in this instance, straddles the long arm and may be frictionally held in place thereon.

The wheel 37 may be rotated at a suitable speed in any well known manner, for example, by means of an electric motor 47 transmitting its action through a belt 48 to a pulley 49 mounted on a shaft 50. The latter may carry a toothed pinion 51 in mesh with the gear 52, which in turn is mounted on a stub shaft 53 carrying a toothed pinion 54, the latter being in mesh with the gear 56 rigidly mounted on the shaft 38. For convenience, only the pitch lines of the gears are indicated in Fig. 2.

Supposing the anvil wheel 37 to be rotating at the proper speed, peas or other suitable commodities may be supplied to the wheel through a hopper 57. The hopper has its lower extremity, which is closely contiguous to the anvil rim 39, slotted, as indicated at 58 in Fig. 6. The slots may be two in number, a slot being located on each side of an intermediate tongue or finger 55. The slots are so arranged that the pins 41 on the revolving anvil rim 39, pass through them, while the tongue 55 at the same time is passed through the space between the two pins 41. It has been found in practice, that this is unfailing in picking up a single pea at a time, from the multitude in the hopper, and in carrying this pea consistently to its destination under the hammer.

In order to make visible, and to record, the degree of compressibility, and consequently the tenderness, of each successive pea which passes through the mechanism, recording means is provided, and is actuated in accordance with the varying degrees of oscillation of the lever means. Exemplary recording means will now be described.

Extending upwardly from the frame 20, may be a post 59 supporting a rotatable carrier wheel 62. The wheel 62 may be journaled on a shaft 60 fixed in the post, and a ratchet wheel 61 may be fast on the hub of the wheel 62. Removably held on the carrier wheel, for example by means of clips 63, is a circular sheet 64 of paper or other suitable material, on which recording lines may be drawn. In the present instance, this circular sheet may be divided into a certain number, for example six, circles, concentric with the wheel 62, and for convenience, the circular sheets may be divided into three or any other suitable number of sectors spaced around an inner circle 65.

A marking member, comprising a stylus or pen 67 and having an inkwell 68, may be mounted on the upper end of a holder 69, the lower part of the holder being fixed in a socket 70 at the outer end of the arm 26. Supposing the pen 67 to be in contact with the circular sheet 64, then, as the lever 23 is caused to move, a corresponding arc will be traced on the sheet. The lengths of the arcs traced on the sheet, correspond to the relative tenderness of the different peas; the more tender the pea, the shorter the arc, for the reason that the hammer sinks farther into the pea before beginning to lift the arm 26.

To produce a readable record, it is necessary that each oscillating stroke be recorded separately, and for this purpose, provision is made to give the paper sheet 64 a slight angular motion between successive recording strokes. The angular movement of the sheet is accomplished by means of the ratchet wheel 61, hereinbefore described. Rotary motion is imparted in the direction of the arrow 71 by means of an actuating pawl 72, pivotally mounted on the end of the rod 73, and urged into contact with the ratchet wheel by a spring 74, the successive positions of the ratchet wheel being held by a second pawl 72a pivoted under the post 59. The upper end of the rod 73 is movable in a guide bracket 75, and the lower end of the rod is pivotally connected to a short arm 77 rigidly mounted on a shaft 76 which also carries a rigidly mounted longer arm 78, the latter being yieldingly held in the normal position indicated in Fig. 2, where it bears against a crosspiece 79, by means of a tension spring 80. The arm 78 is disposed in the path of the successive pins 43 protruding sidewardly from the rim 39, and is arranged so as to be actuated between successive pen strokes, wherefore, as each pen stroke is executed, the paper sheet 64 stands still.

In order to make the tests reliable, a plurality of peas tested relative to one another at one time, should be substantially uniform in size. The usual sifting or screening of peas in a canning plant, into various uniform sizes, provides this consideration.

In practice, a convenient number of peas, such as one hundred, may be placed in the hopper 57, and out of this hopper the peas are picked one by one, by the wheel 37, each pea being individually passed between the floating hammer and the anvil face as heretofore explained, each pea causing the pen to make a stroke on the record. Each pea that passes under the hammer causes the resisting means, consisting of the lever 23 and its appurtenances, to make a graphic stroke on the record, the lengths of the strokes being in exact correspondence with the relative tenderness of the respective peas producing them. The length of a stroke is read off according to the proximity of its outer extremity to any of the numbered circles 1 to 6, and the percentages of peas of certain degrees of tenderness are easily computed.

The exemplary arcs indicated by the full lines crossing the numbered circles in the sector 81, indicate the record of the peas which have passed through the machine before the position of the pen (relative to the line 82) indicated in Fig. 2, has been reached. The dotted arc 83 indicates the arc to be next described by the pen when the pea 45 passes under the hammer and in crushing, raises the hammer to the position shown in Fig. 3.

If desired, the anvil surface 40 may have cupped depressions 84 therein, one just in advance of each pair of pins 41, to aid in holding the peas in position on the anvil face.

Obvious to a skilled designer, is the fact that the invention is susceptible of being embodied in different forms to an unusual degree, and still remain within the spirit and scope of the following claims.

What I claim is:

1. A machine for testing the tenderness of peas, including in combination, anvil means, floating resistance means in cooperative conjunction therewith, comprising an oscillating frame and a hammer rotatable therein, means operative to bring peas one by one into position between the floating resistance means and the anvil means, and means operative to indicate the varying relative degrees of separation between the floating resistance means and the anvil means, as successive peas pass between them.

2. A machine for determining the relative compressibility of commodities, including in combination, anvil means comprising a wheel having an anvil rim, floating hammer means comprising a lever having a fixed fulcrum spaced radially apart from the anvil rim and a hammer supported by the said lever, the hammer being normally poised apart from the anvil means and disposed in cooperative relation thereto, means effective to position a commodity specimen between the floating hammer means and the anvil means, an actuator operative to automatically bring the hammer into striking position relatively to the anvil and a recorder operative to record the relative nearness of approach of the hammer means to the anvil means when different commodity specimens are placed between the floating hammer means and the anvil means.

3. In combination, floating hammer means comprising a lever disposed to oscillate about a fixed pivot, a floating pivot spaced apart from the fixed pivot, and a hammer disposed to swing about the floating pivot, said hammer having a crushing position and a retracted position, anvil means disposed in cooperative relation to the floating hammer, means for inserting individual commodity specimens successively between the hammer and the anvil means, the hammer being effective to exert a uniform pressure upon the successive commodity specimens, and means for conveniently visualizing the relative nearness of approach between the hammer and the anvil means when the successive specimens are subjected to the uniform crushing pressure between the hammer and the anvil means.

4. In combination, anvil means comprising a rotatable anvil rim, pick-up means effective to position individual commodity specimens on the rotatable anvil, a floating frame having a pivotal hammer disposed to bear down with uniform pressure upon successive individual positioned commodity specimens, and means for conveniently visualizing the relative nearness of approach between the floating hammer and the rotatable anvil when a commodity specimen is inserted between them.

5. In combination, a rotatable anvil having a circumferential anvil face, pick-up members spaced apart circumferentially from one another along the anvil face, a floating hammer having a retracted position and an active position, the said hammer in the active position being disposed to come into cooperative conjunction with each successive pick-up member, actuating means in proximity to each pick-up member, said actuating means being effective to bring the said hammer into the said cooperative conjunction, spring means effective to return the said hammer to the retracted position after each successive pick-up member moves out of conjunction with the hammer, and means for feeding commodity items to the said pick-up members so as to enable each pick-up member to pick up a single commodity item for the purpose of bringing it into crushing contact with the hammer.

6. A machine for determining the tenderness of peas, including in combination, a rotatable anvil, means for positioning peas one by one on the rotatable anvil, floating hammer means disposed to exert a uniform crushing pressure upon each successive pea positioned on the anvil, the said floating hammer means comprising a lever having a fixed pivot, a swinging hammer pivotally supported in the said lever in proximity to the said fixed pivot, means for bringing the swinging hammer into crushing conjunction with successive peas on the rotatable anvil, a record sheet rotatably mounted, a marking member mounted on the said lever and in contact with the said record sheet, thereby recording a mark on the record sheet when the lever is moved because of a pea interposed between the hammer and the anvil, and actuating means whereby the said record sheet is moved through a predetermined space between marking movements of the said lever, the said actuating means being motivated at suitable intervals by the said rotatable anvil.

7. In combination, a movable anvil having a face, a lever fulcrumed in operative relation to the anvil face, a swinging hammer supported by the said lever, the said hammer having a non-striking position where its swing radius is other than at right angles to the anvil face, and a striking position where its swing radius is substantially at right angles to the anvil face, means for moving the anvil and the hammer in unison from the non-striking to the striking position, and means for automatically positioning an object on the anvil so that the object will be engaged between the hammer and the anvil in the said movement from non-striking position to striking position.

WILLIAM R. EDDINGTON.